(12) United States Patent
Popović

(10) Patent No.: US 6,804,307 B1
(45) Date of Patent: Oct. 12, 2004

(54) METHOD AND APPARATUS FOR EFFICIENT TRANSMIT DIVERSITY USING COMPLEX SPACE-TIME BLOCK CODES

(75) Inventor: Branislav Popović, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/492,695

(22) Filed: Jan. 27, 2000

(51) Int. Cl.⁷ .......................... H04L 27/04; H04B 1/69
(52) U.S. Cl. .................... 375/299; 375/146; 375/295
(58) Field of Search ................... 375/142, 141, 375/130, 140, 267, 299, 295; 327/164; 370/203, 208, 209, 320, 335, 342, 441, 479; 380/200–251; 455/42–45, 500, 78, 101, 103; 701/226; 708/314

(56) References Cited

U.S. PATENT DOCUMENTS

| | | | |
|---|---|---|---|
| 4,001,692 A | 1/1977 | Fenwick et al. | 325/28 R |
| 4,369,516 A | 1/1983 | Byrns | 375/110 |
| 5,461,646 A | 10/1995 | Anvari | 375/347 |
| 5,499,272 A | 3/1996 | Bottomley | 375/347 |
| 6,091,761 A * | 7/2000 | Popovic | 375/150 |
| 6,377,632 B1 * | 4/2002 | Paulraj et al. | 375/299 |

FOREIGN PATENT DOCUMENTS

| | | |
|---|---|---|
| EP | 0 767546 | 4/1997 |
| WO | WO 99/04519 | 1/1999 |
| WO | WO 99/14871 | 3/1999 |
| WO | 99/14871 | 3/1999 |

OTHER PUBLICATIONS

Tarokh, Space–Time Block Codes from Orthogonal Designs, Jul. 1999, IEEE Transactions on Information Theory, vol. 45, No. 5, pp. 1456–1467.*
Suehiro, Modulatable Orthogonal Sequences and their Application to SSMA Systems, Jan. 1988, IEEE Transactions on Information Theory, vol. 34, No. 1, pp. 93–100.*
Torii, General Construction of Periodic Complete Complementary Codes Composed of Expanded Modulatable Orthogonal Sequences,2000.*
Torii, Expansion of Modulation for Modulatable Orthogonal Sequences, 1998, IEEE, p. 105.*

(List continued on next page.)

Primary Examiner—Young T. Tse
Assistant Examiner—Sam K. Ahn

(57) ABSTRACT

Transmitting a signal in a transmit diversity wireless communication system using 4 antennae, using a complex, multilevel orthogonal space-time code of dimension 4×n, and length p=n. In an exemplary embodiment the method includes the steps of: configuring a first row of a multilevel orthogonal 4×n matrix $G_n^{(ML)}$ as an arbitrary cyclic version of a Generalized Chirp-Like (GCL) sequence of length n; configuring a second row of a multilevel orthogonal 4×n matrix $G_n^{(ML)}$ as the complex-conjugated version of the first row having inverted signs of the first n/2 or the last n/2 out of n consecutive symbols in the first row; configuring a third row as a reverted version of the first row; and, configuring a fourth row as a complex-conjugated version of the third row having inverted signs of a first n/2 or a last n/2 out of n consecutive symbols in the third row.

11 Claims, 6 Drawing Sheets

OTHER PUBLICATIONS

XP000560632—"Modulatable Orthogonal Sequences and their Application to SSMA Systems", Naoki Suheiro et al., IEEE Transactions on Information Theory, vol. 34, No. 1, Jan. 1988, pp. 93–100.

XP–002089112—"Space–Time Codes for High Data Rate Wireless Communication: Performance Criterion and Code Construction", Vahid Tarokh et al., IEEE Transactions on Information Theory, vol. 44, No. 2, Mar. 1998, pp. 744–765.

"Space–Time Block Codes from Orthogonal Designs," Vahid Tarokh et al.; IEEE Transactions on Information Theory; vol. 45, No. 5; Jul. 1999; pp. 1456–1467.

"A Simple Transmit Diversity Technique for Wireless Communications," Siavash Alamouti; IEEE Journal on Select Areas in Communications; vol. 16, No. 8; Oct. '988; pp. 1451–1458.

"Generalized Chirp–Like Polyphase Sequences with Optimum Correlation Properties," Branislav Popović; IEEE Transactions of Information Theory; vol. 38, No. 4; Jul. 1992; pp. 1406–1409.

"GCL Polyphase Sequences with Minimum Alphabets," Branislav Popovićc; Electronic Letters; vol. 30, No. 2; pp. 106–107; Jan. 20, 1994.

"Efficient Matched Filter for the Generalised Chirp–Like Polyphase Sequences," IEEE Trans. on Aerospace and Electronics Systems, vol. 30, No. 3; pp. 769–777; Jul. 1994.

* cited by examiner

METHOD AND APPARATUS FOR EFFICIENT TRANSMIT DIVERSITY USING COMPLEX SPACE-TIME BLOCK CODES

BACKGROUND

The present invention relates to transmit diversity in wireless transmitters and communication systems. More particularly, the present invention relates to a method and apparatus for increasing transmit diversity efficiency using complex orthogonal space-time block codes.

Transmit diversity using multiple transmit antennas and, particularly, space-time block codes has recently attracted a remarkable attention in the communication literature and in the standardization bodies. Transmit diversity provides greatly improved performance on channels subject to multipath fading through the provision of a number of spatially separated replicas of the transmitted signal as may further be described in V. Tarokh, N. Seshadri and A. R. Calderbank, 'Space-Time Codes for High Data Rate Wireless Communication: Performance Criterion and Code Construction, 'IEEE Trans. on Information Theory, Vol. 44, No. 2, pp. 744–765, March 1998; S. Alamouti and V. Tarokh, 'Transmitter diversity technique for wireless communications', U.S. patent application, International Publication Number WO 99/14871, 25 Mar. 1999; and S. M. Alamouti, 'A Simple Transmit Diversity Technique for Wireless Communications', IEEE Journal on Selected Areas in Communications, Vol. 16, NO. 8, pp. 1451–1458, October 1998.

Transmit diversity involves replicas of the transmitted signal being communicated to a receiver on different and independent communication channels, each with a separate transmit antenna, thus increasing the probability that the receiver will receive at least some of the transmit signal replicas which have been less attenuated by fading and related multipath anomalies. Simultaneous signals transmitted from different transmit antennae in a transmit diversity environment have the same information content and differ only in the time domain. Such signal conditions are favorable for maximum likelihood decoding and allow maximum spatial diversity gains to be achieved provided some kind of space-time coding is applied to generate the simultaneous signals.

A simple form of space-time block coding is incorporated in a transmit antenna diversity scheme accepted for the third generation cellular standard (UTRA/FDD) as described in the $3^{rd}$ Generation Partnership Program (3GPP)'s, Techn. Spec. TS 25.211, Physical channels and mapping of transport channels onto physical channels (FDD), September 1999. The transmit diversity scheme described therein, using two transmit antennas, is generally equivalent to another block coding scheme proposed, for example, by Alamouti as further described in "Transmitter diversity technique for wireless communications", supra and "A Simple Transmit Diversity Technique for Wireless Communications", supra. Compared to space-time trellis codes as described in 'Space-Time Codes for High Data Rate Wireless Communication: Performance Criterion and Code Construction," supra, space-time block codes allow a much less complex decoding scheme to be used in the receiver. Despite certain performance losses compared to the space-time trellis codes, space-time block codes nevertheless provide the ability to achieve much lower decoding complexity making them a very attractive alternative for the practical applications and have merited further study as described in V. Tarokh, H. Jafarkhani and A. R. Calderbank, "Space-Time Block Codes from Orthogonal Designs", IEEE Trans. on Information Theory, Vol. 45, No. 5, pp. 1456–1467, July 1999.

Accordingly, lower decoding complexity transmit diversity may be achieved based on space-time block-codes having "m" information symbols which are coded into "n" codewords, each of length "p" code symbols. All codewords may then be transmitted simultaneously from "n" antennas. The minimum receiver complexity can be obtained if the codewords are orthogonal. At the same time, the codewords must be unique (and orthogonal) for any particular content of information symbols. Accordingly, space-time block codewords may preferably be obtained by weighting, conjugation and repetition of information symbols, or by combination of these three operations. The transmission rate R, defined as the ratio between the number of information symbols to the number of transmitted symbols in a codeword, is desirable to be as large as possible, ideally equal to 1. It should be noted that the receiver complexity is proportional to the length of codewords. For given number of antennas n, the minimum length of orthogonal codewords IS $P_{min}=n$.

A larger transmit diversity gain may be obtained using a larger number of transmit antennas. Space-time block codes useful for larger numbers of transmit antennas are studied in "Space-Time Block Codes from Orthogonal Designs", supra, where a systematic complex space-time block coding method is developed, that for any number of antennas n>2 codes of rate R=0.5, having the codeword's length p greater than or equal to 2n may be produced. In addition to systematic code construction, two sporadic codes of rate R=0.75, for n=3 and n=4 are presented. It should be noted that the code for n=3 may actually be obtained from the code for n=4 by deleting a single codeword. The sporadic space-time code for n=4 has codewords of length p=4. However, information symbols in the codewords are weighted by the multilevel coefficients, so the actual transmitted signals from each of the antennas have non-constant envelopes regardless of whether the information symbols are associated with a constant-envelope modulation format (e.g. BPSK, MSK, etc.).

It should be noted that all the above codes may provide maximum spatial diversity order (gain) for a given number of transmit antennas. The conditions for maximum spatial diversity order is that each codeword contains all of information symbols, and that each information symbol is repeated an equal number of times within the codeword. It should further be noted that all the above codes may be valid for any arbitrary modulation format of information symbols. If the modulation format is restricted to be a constant-envelope modulation scheme, an alternative space-time block code of minimum length may be derived by using any Hadamard matrix as described in J.-C. Guey, M. P. Fitz, M. R. Bell and W.-Y. Kuo, 'Signal design for transmitter diversity wireless communication systems over Rayleigh fading channels,' in Proc. 1996 Veh. Technol. Conf., Atlanta, Ga., 1996, pp. 136–140. Namely, if each column of some "n×n" Hadamard matrix is multiplied symbol-by-symbol with the same string of n information symbols with constant envelope, the resulting matrix is the orthogonal space-time block code of minimum length and of rate R=1. It will be appreciated that the space-time block codewords are the columns of the resulting orthogonal matrix. It should further be noted that information symbols transmitted according to a constant-envelope modulation format all have a constant absolute value.

Problems arise however, in that systematic complex space-time codes proposed in "Space-Time Block Codes from Orthogonal Designs", supra may have twice or more times longer codeword's length than the minimal possible ($p_{min}=n$). Hence they are not optimal from the decoder complexity point of view. Further problems arise in that a sporadic space-time block code for n=4, may have the minimum codeword length (p=4), however, information symbols are weighted by the multilevel coefficients leading to more difficult requirements for associated power amplifiers. Power amplifiers configured to deal with transmission based on sporadic space-time block codes, must deal with the more stringent requirements associated with higher peak power and higher range of linearity.

Still further problems arise in that space-time block codes described, for example, in 'Signal design for transmitter diversity wireless communication systems over Rayleigh fading channels", supra are both of a minimum length and of a maximum rate, however, they are valid only for constant-envelope modulation formats. Moreover, such codes are non-cyclic, leading to a disadvantage in that the use of cyclic codes generally lead to a decrease in decoder complexity. It should be noted that cyclic codes as will be understood by those skilled in the art are an important subclass of linear block codes which can easily be implemented in hardware using, for example, feedback shift registers and the like. A cyclic code may be defined in simple terms as a code where a subsequent code vector may be obtained from a previous code vector with one or more end around or cyclic shifts depending on, for example, the order of the underlying generator polynomial.

Thus, it can be seen that while the above mentioned methods address certain issues and problems, the difficulty posed by, for example, the use of many transmit antennae remains inadequately addressed. It would therefore be appreciated in the art for a method and apparatus for new cyclic complex space-time block codes having the minimum possible codeword length for a given number of antennas, in order to minimize decoder complexity increasing the efficiency of transmit diversity when larger numbers of transmit antennas are used. Information symbols in such space-time codes should be weighted by constant magnitude coefficients and should be valid for constant-envelope modulation formats or any arbitrary modulation formats of information symbols.

SUMMARY

To reduce the impact of the use of larger numbers of antennas, a method and apparatus for transmitting a signal in a transmit diversity wireless communication system using n antennae in accordance with one embodiment of the present invention includes constructing an n×n orthogonal matrix $G_n$ having n columns and n rows. Each column and row corresponds to n cyclic shifts of a modulatable orthogonal sequence $g_m$, where m is a number of information symbols. The m information symbols may further be coded into n codewords corresponding to n columns of the matrix $G_n$. Different ones of the n codewords simultaneously transmitted on corresponding ones of the n transmit antennae. It should be noted that the n codewords may also correspond to the n rows of the matrix $G_n$.

In accordance with alternative exemplary embodiments, the n codewords may also correspond to the n rows of the matrix $G_n$ obtained by permuting the n columns of the matrix $G_n$, to the n columns of the matrix $G_n$ obtained by permuting the n rows of the matrix $G_n$, to a complex-conjugated version of the n codewords, to a sign-inverted version of the n codewords, or to a sign-inverted and complex-conjugated version of the n codewords.

In accordance with yet another exemplary embodiment having 4 transmit antennae, a first row of a multilevel orthogonal 4×n matrix $G_n^{(ML)}$ may be configured as an arbitrary cyclic version of a GCL sequence of length n, a second row of a multilevel orthogonal matrix $G_n^{(ML)}$ as the complex-conjugated version of the first row having inverted signs of the first n/2 or the last n/2 out of consecutive symbols in the first row a third row as a reverted version of the first row, and a fourth row as a complex-conjugated version of the third row having inverted signs of a first n/2 or a last n/2 of consecutive symbols in the row. Thus codewords of a complex space-time block code may be taken as the rows of $G_n^{(ML)}$. For a GCL sequence of length 4, rows or columns of a multilevel orthogonal matrix $G_4^{(ML)}$ may be taken as codewords.

In still another exemplary embodiment, a signal in a transmit diversity wireless communication system having n transmit antennae, may be decoded by receiving n signal samples and forming a received sequence of length n representing, for example, an unknown block of information symbols. The received sequence may be correlated with a reference sequence associated with the complex orthogonal space-time block code. The reference sequence may be cyclically shifted n−1 times and each of the shifted reference sequences correlated with the received sequence. Moreover each of the n cyclic correlations generated may be weighted with a complex conjugate of an estimated channel coefficient and summed in order to obtain a decision metric. Additional decision metrics may further be generated for additional reference sequences associated with the complex orthogonal space-time block code. The decoded block of information symbols corresponding to the unknown block of information symbols represented by the received signal samples may be selected as corresponding to the reference sequence which produces a decision metric which is favorable.

BRIEF DESCRIPTION OF THE DRAWINGS

The objects and advantages of the invention will be understood by reading the following detailed description in conjunction with the drawings, in which.

DETAILED DESCRIPTION

Figure 1:
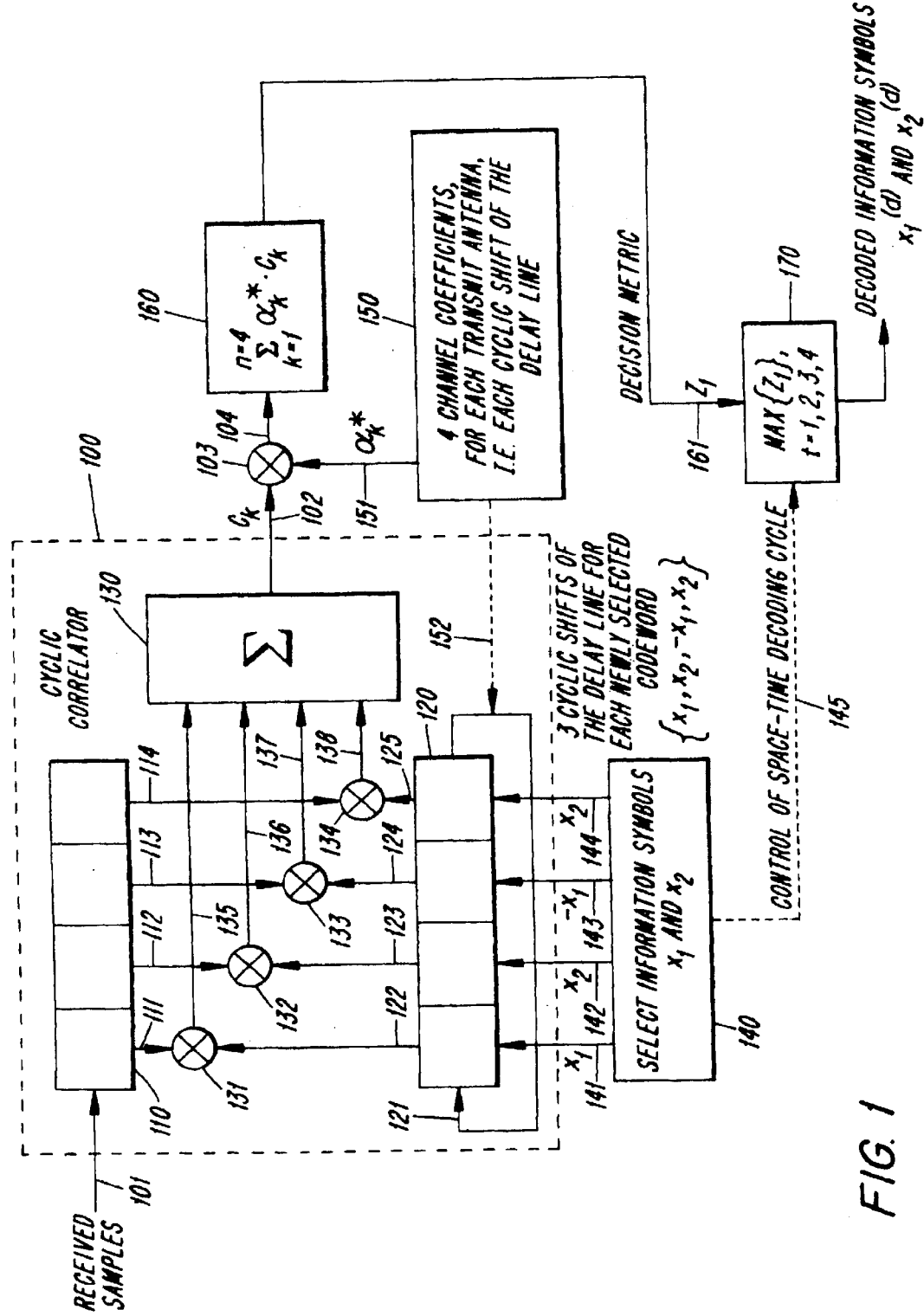
FIG. 1 is a diagram illustrating exemplary space-time decoding using cyclic correlation in accordance with the present invention.

The various features of the invention will now be described with reference to the figures, in which like parts are identified with the same reference characters.

Thus, in accordance with the present invention, a method and apparatus are described providing a solution to the above mentioned problems based on the application of so-called modulatable orthogonal sequences in space-time block codes. A modulatable orthogonal sequence may be modulated by a shorter string of arbitrary, constant-envelope symbols and still maintain a relation to an ideal periodic autocorrelation function, which is equal to zero for all non-zero time shifts.

In one exemplary embodiment in accordance with the present invention, a complex orthogonal space-time code of dimension n, corresponding to n antennae, and length p=n, may be defined by the orthogonal matrix $G_n$ which may be obtained by taking the columns to be all the different cyclic shifts of a single modulatable orthogonal sequence $g_k$ of length $n=s \cdot m^2$. The transmission rate of the code may be defined as R=1/sm. The codewords of the space-time block code are the columns or the rows of matrix $G_n$. The code may be valid for any constant-envelope modulation format of information symbols.

To better understand the present invention it may be useful to describe some additional principals related thereto. It will be appreciated that any modulatable orthogonal sequence $\{g_k\}$ of length $n=s \cdot m^2$ may be defined as:

$$g_k = a_k \cdot x_{k \bmod m}, \quad k=0, 1, \ldots, n, \quad (1)$$

where $\{x_i\}$, i=0, 1, ... m−1 is a modulating string of m arbitrary complex numbers having a periodic, constant magnitude modulation with a periodicity m according to the "carrier" sequence $\{a_k\}$ of length $n=s \cdot m^2$. The modulating symbols $\{x_i\}$ correspond to information symbols in the space-time code when the modulatable orthogonal sequence is used in accordance with the present invention.

A very general class of modulatable orthogonal sequences is the class of Generalized Chirp-Like (GCL) sequences as described, for example, in B. M. Popovic, 'Generalized Chirp-Like Polyphase Sequences with Optimum Correlation Properties', IEEE Trans. on Information Theory, Vol. 38, No. 4, pp. 1406–1409, July 1992; B. M. Popovic, 'Efficient Matched Filter for the Generalised Chirp-Like Polyphase Sequences', IEEE Trans. on Aerospace and Electronics Systems, Vol. 30, No. 3, pp. 769–777, July 1994; and B. M. Popovic, 'GCL polyphase sequences with minimum alphabets', Electronics Letters, Vol. 30, No. 2, pp. 106–107, Jan. 20th, 1994. In GCL polyphase sequences with minimum alphabets' large subclass of GCL sequences with minimum alphabets may be derived. If the modulatable orthogonal sequence is a GCL sequence, the carrier sequence $\{a_k\}$ may be defined as:

$$a_k = W_n^{k(k+n \bmod 2)/2 + qk}$$

q is any integer (2)

where $W_n = e^{j2\pi r/n}$, $j=\sqrt{-1}$, and r is any integer relatively prime to n.

The definition of carrier sequence $\{a_k\}$ given in Equation (2) may be modified according to "GCL polyphase sequences with minimum alphabets", supra, in order to directly define the space-time codes having the codewords with minimum-alphabet weighting coefficients of information symbols. Hence the minimum-alphabet space-time block codes based on GCL sequences can be obtained if the carrier sequence, $\{a_k\}$ is defined as:

$$a_k = W_n^{[k(k+n \bmod 2)/2 + qk] - [i(i+n \bmod 2)/2 + qi]}$$

$i=k \bmod n$, q is any integer (3)

For $n=m^2$, the GCL sequences as defined, for example, in Equations (1) and (3) may be equivalent to the Generalised Frank sequences as may further be described in N. Suehiro and M. Hatori, 'Modulatable Orthogonal Sequences and Their Application to SSMA Systems', IEEE Trans. on Information Theory, Vol. 34, No. 1, pp. 93–100, January 1988.

Constructing a code in accordance with one exemplary embodiment of the present invention may best be understood with reference to the following example.

EXAMPLE 1

For n=4, a complex orthogonal space-time code $G_4$ of rate R=0.5 in accordance with the present embodiment and equations (1) and (3) is:

$$G_4 = \begin{bmatrix} x_1 & x_2 & -x_1 & x_2 \\ x_2 & -x_1 & x_2 & x_1 \\ -x_1 & x_2 & x_1 & x_2 \\ x_2 & x_1 & x_2 & -x_1 \end{bmatrix} \quad (4)$$

It should be noted that the complex correlation between any two columns or rows of matrix $G_4$ is zero assuming, for example, that all information symbols have the same envelope.

EXAMPLE 2

For n=8, a complex orthogonal space-time code $G_8$ of rate R=0.25 in accordance with the present embodiment and equations (1) and (3) is:

$$G_8 = \begin{bmatrix} x_1 & x_2 & jx_1 & -x_2 & x_1 & -x_2 & jx_1 & x_2 \\ x_2 & jx_1 & -x_2 & x_1 & -x_2 & jx_1 & x_2 & x_1 \\ jx_1 & -x_2 & x_1 & -x_2 & jx_1 & x_2 & x_1 & x_2 \\ -x_2 & x_1 & -x_2 & jx_1 & x_2 & x_1 & x_2 & jx_1 \\ x_1 & -x_2 & jx_1 & x_2 & x_1 & x_2 & jx_1 & -x_2 \\ -x_2 & jx_1 & x_2 & x_1 & x_2 & jx_1 & -x_2 & x_1 \\ jx_1 & x_2 & x_1 & x_2 & jx_1 & -x_2 & x_1 & -x_2 \\ x_2 & x_1 & x_2 & jx_1 & -x_2 & x_1 & -x_2 & jx_1 \end{bmatrix} \quad (5)$$

It should be noted that while two exemplary embodiments of a space-time block code in accordance with the present invention are shown in Examples 1 and 2, other embodiments are possible. For example, for an exemplary embodiment with n=16, space-time coding in accordance with the present invention and equations (1) and (3) result in the space-time block code $G_{16}$ of rate R=0.25, with the codewords consisting of information symbols weighted by 1, −1, j and −j.

A portion of an exemplary receiver/decoder configuration is illustrated in FIG. 1. In order for a receiver to decode transmitted codewords, given that codewords constructed in accordance with the present embodiment may be cyclic versions of each other, maximum likelihood decoding may preferably be used. The complexity and decoding time associated with maximum likelihood decoding may be reduced by using, preferably, one cyclic correlator 100. It should be noted that reference sequence 141–144 used in cyclic correlator 100 may be cyclically shifted in feedback shift register 120 n−1 times, where "n" is the number of codewords, via feedback path 121. An implementation of a cyclic correlator matched to GCL sequences may be derived from "Efficient Matched Filter for the Generalised Chirp-Like Polyphase Sequences", supra. The correlator scheme described therein may be modified and thus cyclic correlator 100 may be configured to perform circular correlation of block 110 of received signal samples 101 with a selected reference GCL sequence. Each selected reference GCL sequence may correspond to one of $2^m$ possible combinations of m binary information symbols. Each circular correlation corresponds to the signal transmitted from a particular transmit antenna and weighted by a corresponding channel coefficient characterizing the propagation path from that transmit antenna to the receiving antenna. Therefore decision metric 161 for a given combination of information symbols may be formed in block 160 by summing, for example, all n circular correlations 102 formed in block 130 after weighting each of them at node 103 by complex conjugate 151 of the corresponding estimated channel coefficient. It should be noted that estimated channel coefficients may be formed in block 150 for each transmit antennae corresponding to each cyclic shift of cyclic correlator 100.

A block 110 of received signal samples 101 representing an unknown block of information symbols and including, for example, samples 111–114, to be properly decoded, may preferably be circularly correlated at nodes 131–135 with all possible $2^m$ sequences 122–125 from block 120. It should be noted that sequences 122–125 may preferably be stored in block 120 using a memory device such as a register or the like, as would be appreciated by one of skill in the art, after being generated in block 140. Accordingly, $2^m$ decision metrics 161 are formed. The combination of information symbols which produces a maximum decision metric, optimum decision metric, or otherwise favorable comparison, for example, as in block 170, may be chosen or otherwise selected as the decoded block of information symbols 171. It should further be noted that while exemplary space-time block decoding illustrated in FIG. 1 is based on cyclic correlation for the exemplary code $G_4$, it is possible for codes $G_n$ to be decoded in a similar manner by, for example increasing the size of cyclic correlator 100 while preserving its overall structure. It should still further be noted that for multiple receiving antennas, decision metrics 161 for each receive antennae corresponding to the same combination of information symbols are separately summed before the final decision.

Figure 2:
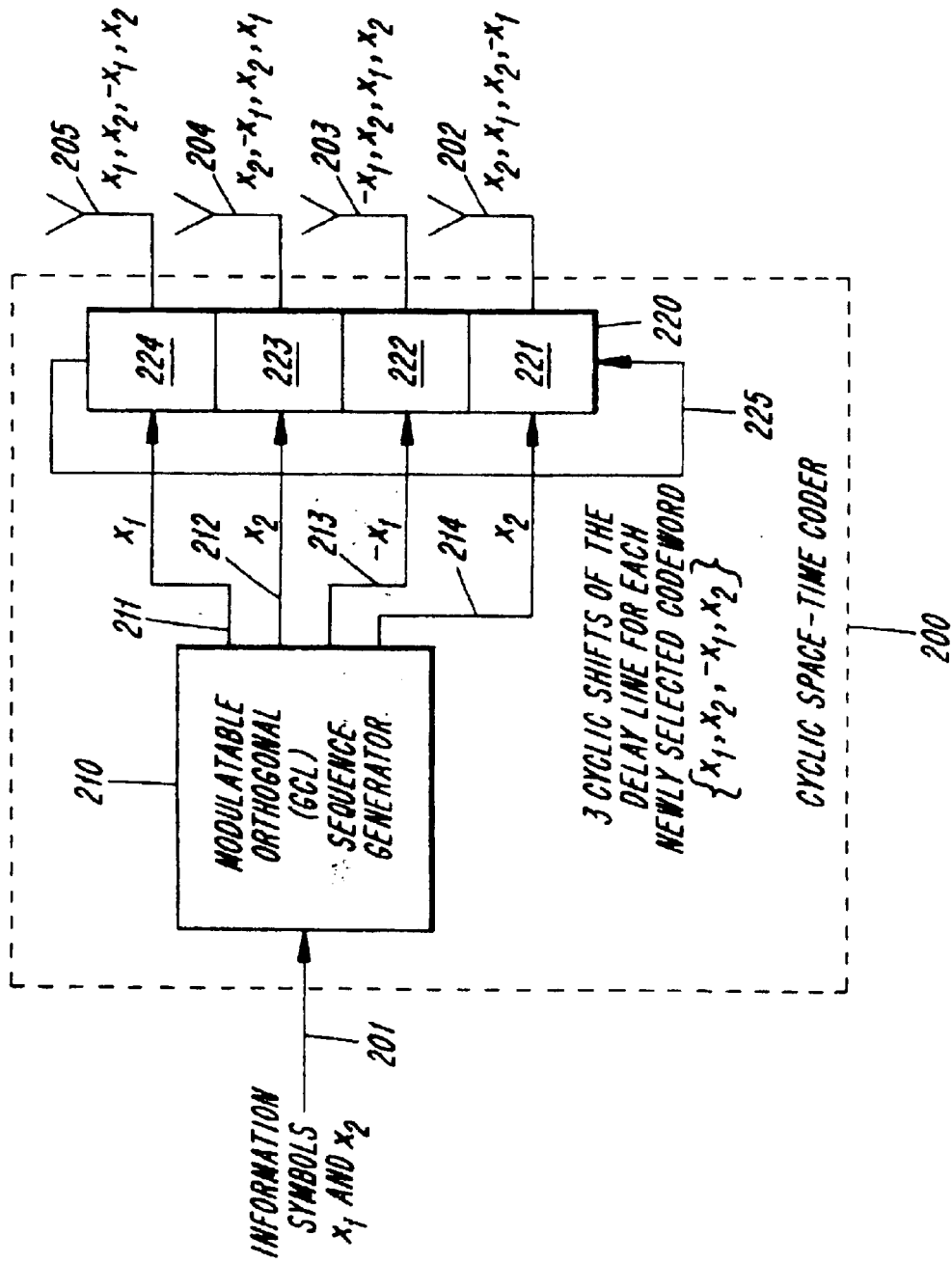
FIG. 2 is a diagram illustrating an exemplary cyclic coder in accordance with the present invention.

It will be appreciated by those skilled in the art that cyclic space-time block codes, such as those proposed above in addition to allowing a simplified receiver to be constructed, e.g. in accordance with the description of FIG. 1 above, further allow for simplification of a transmitter which may preferably be embodied as cyclic space-time coder 200, an exemplary illustration of which is found in FIG. 2. In accordance with this embodiment, only one codeword may be generated for each combination of information symbols $x_1 x_2$ 201, which information symbols as may be described, for example, in relation to the description of Equation (1) hereinabove. The components 211–214 of the codeword may then be stored in delay line consisting of n memory elements such as exemplary feedback shift register 220 with memory elements 221–224. Each memory element 221–224 may be connected to separate antennae 202–205. Accordingly, after loading feedback shift register 220 with sequence, components 211–214 from modulatable orthogonal sequence generator 210 associated with, for example, a first codeword, components 221–224 of all n=4 codewords corresponding to a single particular content of information symbols $x_1$ and $x_2$ can be obtained in parallel after n−1 subsequent cyclic shifts of feedback shift register 220, via feedback path 225. It should be noted that exemplary cyclic space-time coder 200 shown in FIG. 2 is configured for an exemplary code $G_4$.

In an alternative embodiment of the present invention, for example, in conjunction with a conventional CDMA system, a code spreading operation in a transmitter may be performed after transmit diversity space-time coding of information symbols is performed. An example of a transmission scheme employing code spreading after space time block coding based transmit diversity (STTD) is proposed for the third generation cellular system UTRAN as may be shown in FIG. 3A and FIG. 4A.

Figure 3A:
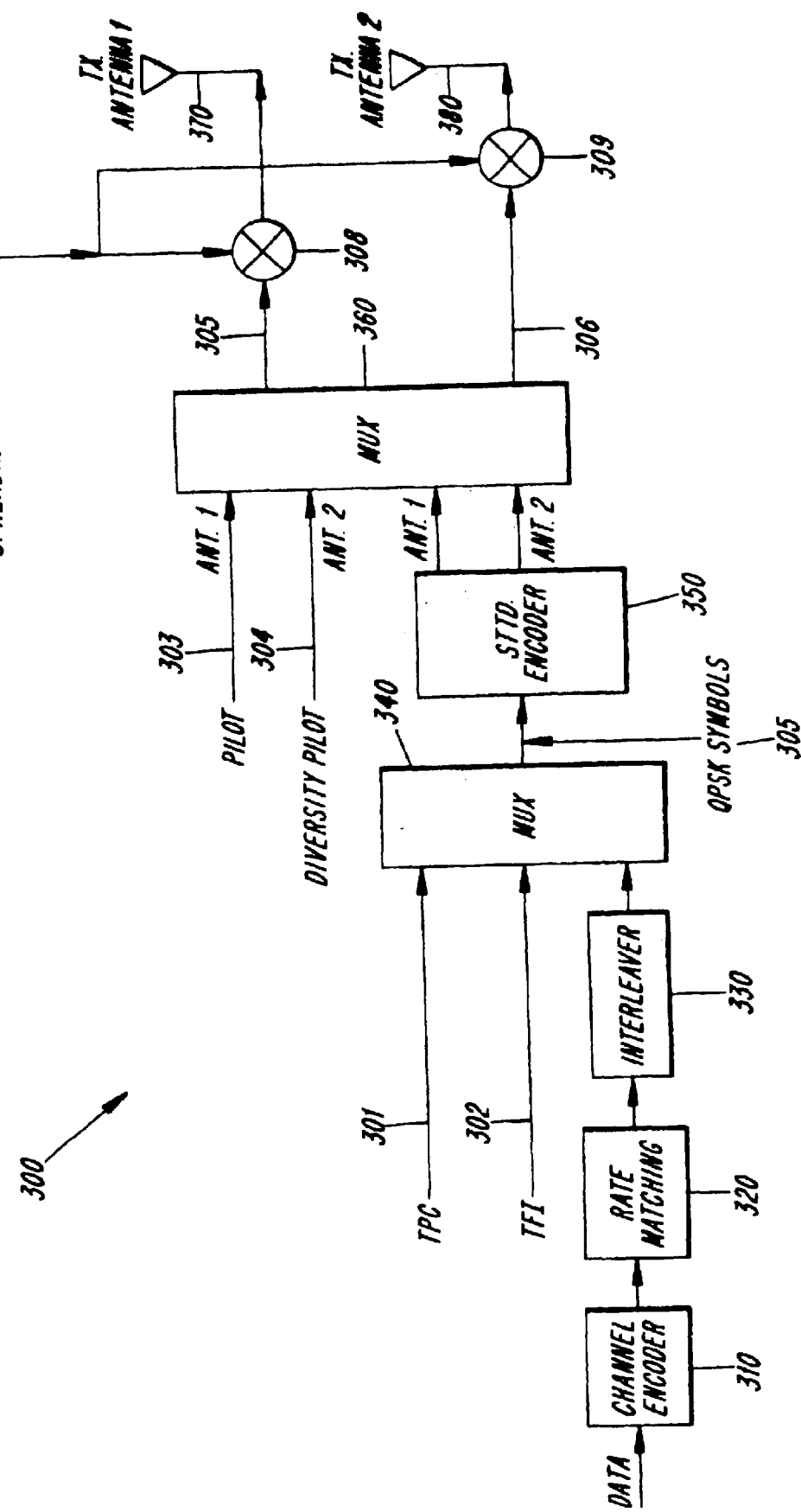
FIG. 3A is a block diagram illustrating an exemplary conventional STTD transmitter.

With reference to FIG. 3A, conventional transmitter system 300 may perform, for example, conventional operations on incoming data including operations associated with channel coding block 310, rate matching block 320, and interleaving block 330 which operations may be performed as would be in a non-diversity mode. Transmit Power Control (TPC) bits 301 and Transmit Frame Indicator(TFI) bits 302 and may further be combined with coded data in Multiplexer 340 to produce, for example, QPSK symbols 305. At this stage, STTD encoder 350 may apply a space-time transmit diversity related code to QPSK symbols 305 as is known and apply the codewords associated with transmit antenna 1 370 and antenna 2 380 to Multiplexer 360 along with pilot bits 303 and diversity pilot bits 304. The coded output streams 305 and 306 may then be combined with channelization code 307 for ultimate transmission.

Figure 4A:
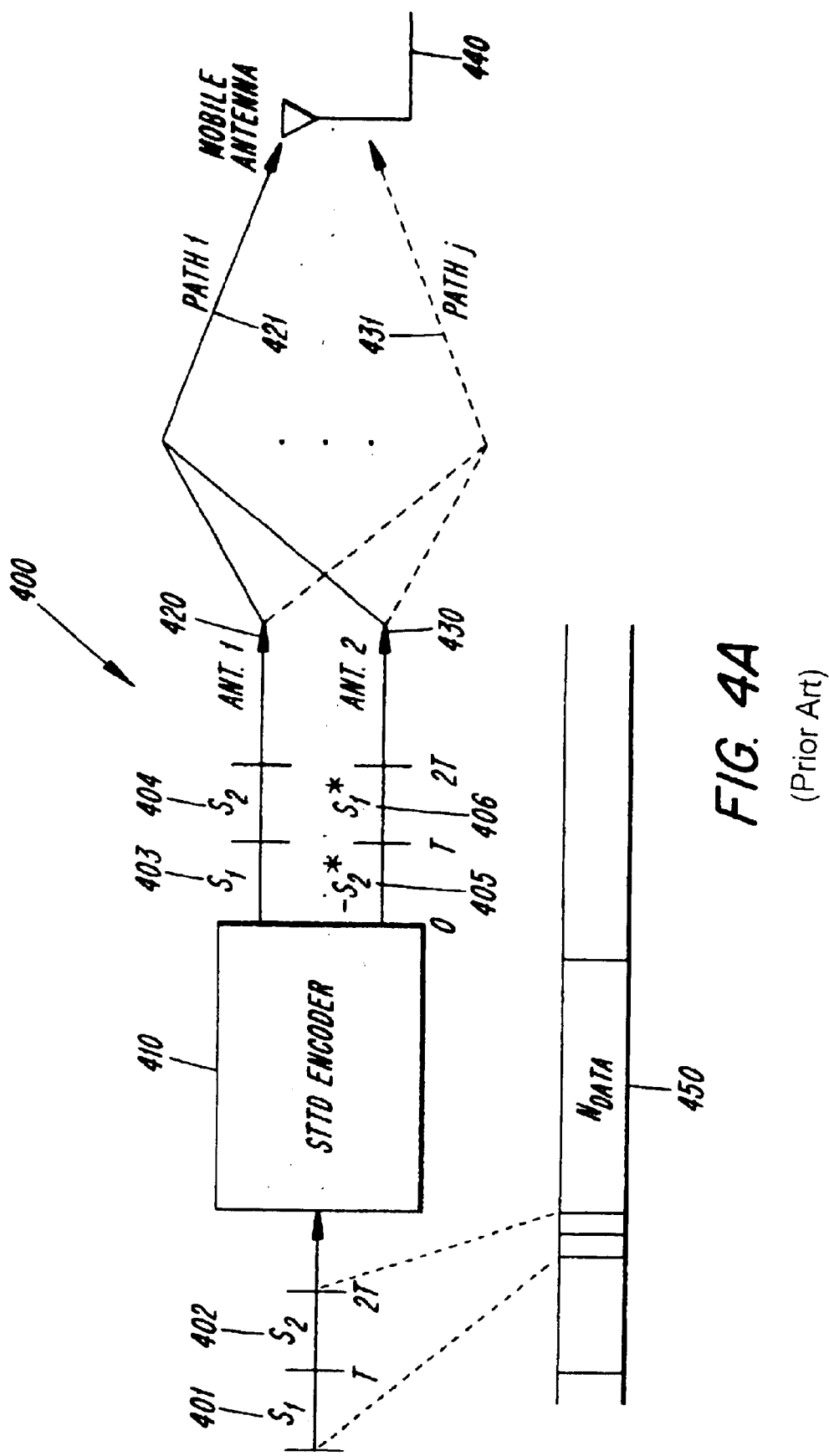
FIG. 4A is a diagram illustrating an exemplary conventional STTD encoder.

FIG. 4A illustrates the application of conventional space-time coding and spreading codes associated with $N_{data}$ 450, which codes may be denoted as, for example, $S_1$ 401 and $S_2$ 402. Codes $S_1$ 401 and $S_2$ 402 may be input to space-time transmit diversity encoder 410 producing transmit signal $S_1$ 403 and $S_2$ 404 for transmission on antenna 1 420 and conjugated and inverted transmit diversity signal $S_2$ 405 and conjugated transmit diversity signal $S_1$ 406. Signals transmitted from antennae 420 and 430 may, as can be appreciated, propagate along many different paths such as, for example, path 1 421 to path j 431 finally being received at mobile antenna 440, thus illustrating an exemplary end to end wireless communication system providing space-time coding and spreading in different steps giving rise to disadvantages such as making the coding and decoding process more complex and more expensive since additional hardware is generally required.

Figure 3B:
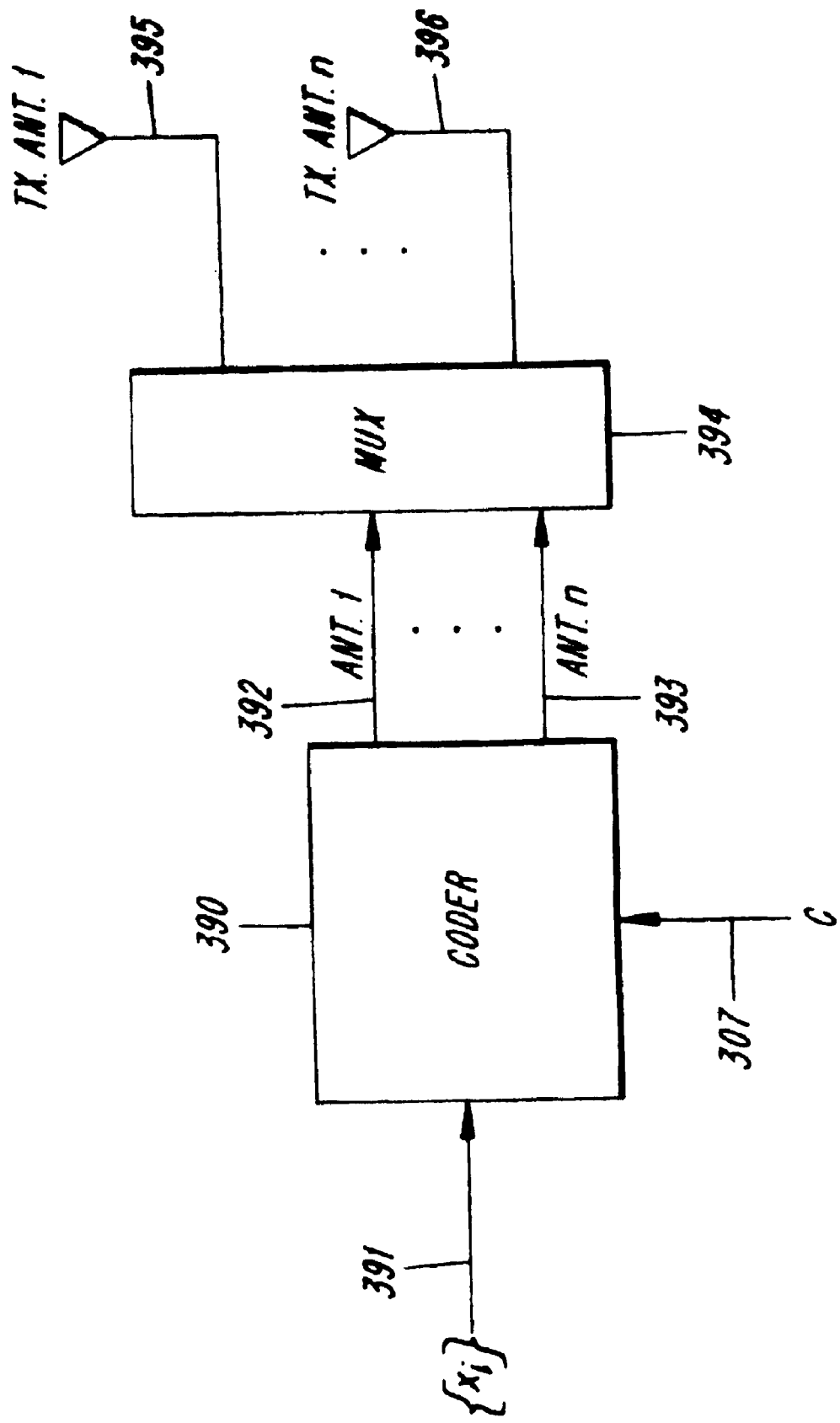
FIG. 3B is a block diagram illustrating an exemplary STTD transmitter in accordance with the present invention.
Figure 4B:
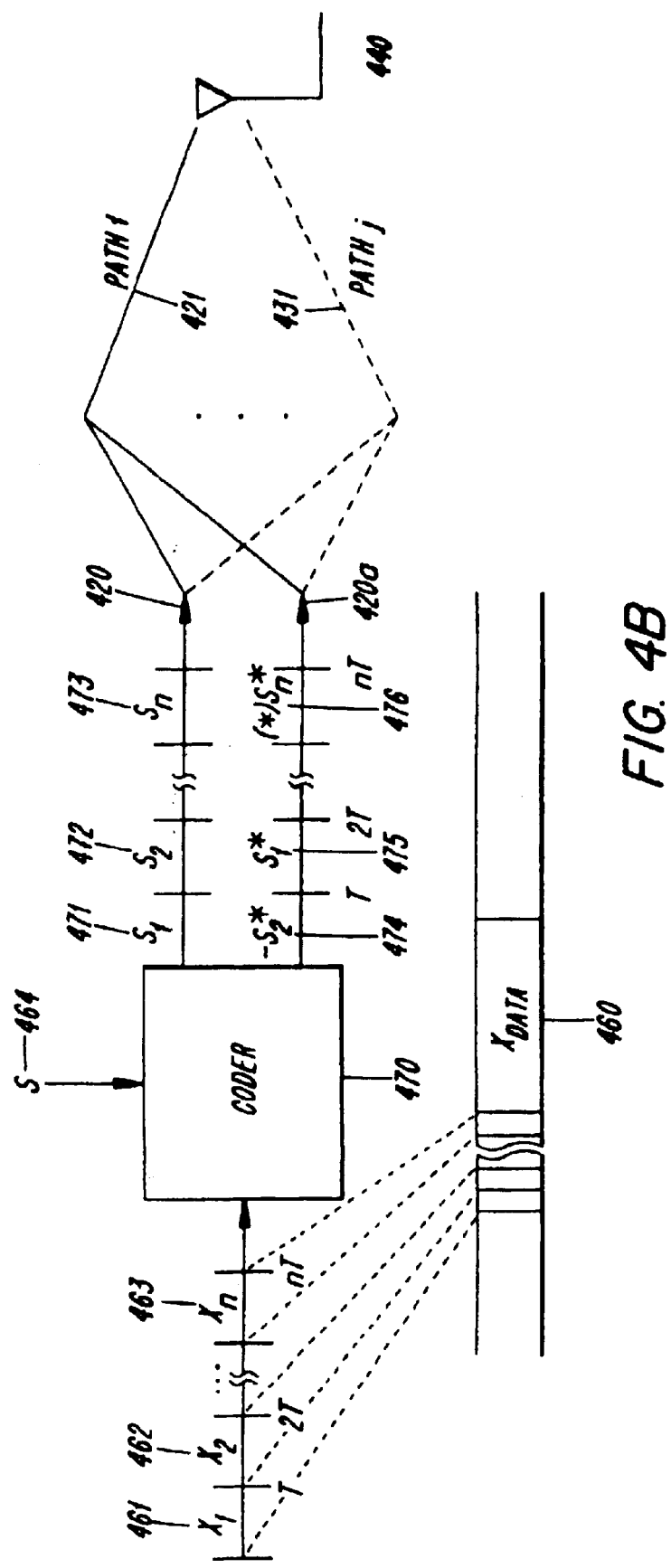
FIG. 4B is a diagram illustrating an exemplary STTD encoder in accordance with the present invention.

Accordingly, in a wireless communication system in accordance with yet another exemplary embodiment as shown in FIG. 3B and 4B, advantages may be provided over conventional systems such as those exemplary systems presented, for example, in FIG. 3A and 4A. It should be noted that the present invention may be embodied by generating modulatable orthogonal codewords of arbitrary length, for example, in rectangular matrices within coding blocks such as, for example, coder 390 in FIG. 3B and coder 470 in FIG. 4B and used to concurrently encode for transmit diversity and spreading. In FIG. 3B, information symbols 391 may be input to coder 390 along with channelization/scrambling/spreading code C 307 and respective sequences 392 to 393 for antennae 1 through n, may be input to multiplexer 394. The transmit signals and diversity signals in which the diversity code and the channelization/scrambling/spreading codes are applied concurrently may be output at antennae 1 395 to antennae n 396. Similarly, uncoded data associated with slots from data stream $X_{data}$ 460 may be input to coder 470 in "slots" associated with T, 2T, and so on up to nT. Spreading code 464 may also be input to coder 470 such that transmit diversity coding and spreading may be performed concurrently. Spread vectors $S_1$ 471, $S_2$ 472, up to $S_n$ 473 and repsective conjugates and inverted conjugates such as $-S_2$* 474, $S_1$* 475, and (*)$S_n$*, where (*) could be sign positive or negative depending on the value of n. It should be noted that the values of $S_1$ and $S_2$ as well as the exact sequence of conjugates will depend on the particular combination associated with each codeword generated in accordance with the present invention.

Codewords may be output on antennae 1 420 through antennae n 420*a* and propagate along path 1 421 through path j 431 although it should be noted that a virtually limitless number of paths may be taken by signals propagating in a wireless environment. Transmit diversity codewords may further be received at mobile antennae 440 and decoded in accordance with, for example, a decoder similar as described with reference to FIG. 1.

Accordingly, it may be possible to perform space-time coding and spreading in one step assuming, for example, that channelization codes, normally used for spreading and separation of different users, can be used also for space-time coding. In such a case, different orthogonal channelization codes such as, for example, Walsh sequences, may be allocated for use for both space-time coding and spreading in order to separate the signals transmitted from different antennae.

Such transmit diversity is called Code Division Transmit Diversity (CDTD) as further described in "Transmit Diversity by Antenna Selection in CDMA Downlink", A. Hottinen and R. Wichman, ISSSTA '98, pp.767–770, September 1998. As in the case of STTD, minimum distance between space-time codewords used in CDTD is proportional to the spreading factor (SF). It should be noted that the relation between code distance and SF relates to each data symbol being repeated SF times in order to make possible code spreading using multiplication of data symbols with SF chips of the channelization code. It should further be noted that in third generation cellular systems, variable data rates, i.e. spreading factors, may be specified on a per user basis resulting in variability of the minimum distance between the space-time codewords. Such minimum distance variability carries a disadvantage in that the performance of space-time coding/decoding depends on the data rate if the received signal power is constant for all data rates.

Accordingly, space-time codes based on modulatable orthogonal sequences in accordance with the present invention may offer, for example, constant, maximized minimum distance between space-time codewords depending on the data rate as may be illustrated by numerical examples which follow. In UTRA/FDD, users with different data rates may be spread by orthogonal channelization codes, such as Walsh sequences, of different lengths. The lengths may correspondingly be equal to spreading factors associated with different user's data rates. Moreover, in UTRA/FDD mode of UTRAN the spreading factors can vary from 4 to 256, depending of the data rate. In contrast, Walsh sequence-based channelization codes may, alternatively, be replaced by a set of 256 orthogonal channelization codes each having a length of 256 chips. Thus, the alternative set of channelization codes may represent all the different cyclically shifted versions of a single GCL sequence of length 256. A number of channelization codes, equal, for example, to the number of transmit antennae used in a transmit diversity system, may be allocated to each user. It should be noted however, that GCL channelization codes corresponding to different users are generally not orthogonal since different users, in principle, may use different information symbols. Therefore, the use of orthogonal codes in accordance with the present embodiment may require some other mechanism to "separate" different users to be applied, for example, different scrambling codes may be used to distinguish between channel users.

The number of different modulating information symbols in such GCL sequences is 16, corresponding to SF=16 in UTRA/FDD. Of course, if some of the 16 symbols are taken to be the same, i.e. if a smaller number of information symbols are transmitted, that would correspond to an increased spreading factor in UTRA/FDD. In that way, it is possible to support spreading factors SF=16, 32, 64, 128 and 256. Whichever spreading factor among the previous is chosen, the orthogonal ST codewords are of length 256, so the minimum distance between the ST code words is maximized. If only one information symbol is transmitted per channelization code (SF=256), the above transmission diversity scheme is equivalent to CDTD scheme.

Decoding such variable rate space-time codes, in accordance with the present embodiment, may involve joint despreading and space-time decoding. It should be noted that joint despreading and space-time decoding preferably results in a performance advantage compared with a conventional, two-stage receiver, where despreading and then space-time decoding is performed. Performance gains may be related to gains achieved using repetitive coding as compared to orthogonal coding: orthogonal binary codes have N/4 times larger minimum distance compared to the binary repetitive codes of N information bits, assuming the codewords are the same length in both cases. Use, therefore, of orthogonal codes may generally result in a greater degree of complexity in the design of a corresponding decoder. However, in the case of cyclic space-time block codes in accordance with the present invention, complexity may be reduced, for example, as described with reference to FIG. 1.

In an alternative embodiment of a space time block coder in accordance with the present invention, a complex, multilevel orthogonal space-time code of dimension 4×n, corresponding to 4 antennae, and length p=n may be defined by orthogonal matrix $G_n^{(ML)}$ obtained from the generalized chirp-like sequences of length n as in EQ (1)–(3) by the following series of steps:

1. A first row may be configured as an arbitrary cyclic version of a GCL sequence of length n.
2. The second row may be configured as the complex-conjugated version of the first row having inverted signs of the first n/2 or the last n/2 (out of n) consecutive symbols in the row.
3. The third row may be configured as the reverted version of the first row.
4. The forth row may be configured as the complex-conjugated version of the third row having inverted signs of the first n/2 or the last n/2 (out of n) consecutive symbols in the row.

Codewords of the space-time block code may be taken as the rows of matrix $G_n^{(ML)}$. The code is valid for arbitrary complex, multilevel-envelope modulation format of information symbols. In a special case, where a GCL sequence is of length 4, e.g., n 4, codewords of the space-time block code may be taken as the rows or the columns of matrix $G_n^{(ML)}$. It should be noted that in the case where n=4, the transmission rate of the code is R=0.5.

EXAMPLE 3

Assuming that the first two consecutive symbols are inverted in steps 2 and 4 of the steps described above, the following complex orthogonal space-time code $G_4^{(ML)}$ of rate R=0.5 may be obtained starting from the GCL sequence $\{x_1, x_2, -x_1, x_2\}$:

$$G_4^{(ML)} = \begin{bmatrix} x_1 & x_2 & -x_1 & x_2 \\ -x_1^* & -x_2^* & -x_1^* & x_2^* \\ x_2 & -x_1 & x_2 & x_1 \\ -x_2^* & x_1^* & x_2^* & x_1^* \end{bmatrix} \quad (6)$$

Accordingly, the complex correlation between any two columns or rows is zero, for arbitrary values of information symbols.

It should be noted that complex space-time block codes in accordance with the present invention may provide many advantages over conventional codes, such as providing a minimum code length for given number of antennae, and providing for reduced receiver complexity. Moreover, as codewords of a space-time code are cyclic versions of each other, complexity and decoding time of maximum likelihood decoding can be reduced by using a single cyclic correlator. The reference sequence of such a correlator may be cyclically shifted a number of times equal to the number of codewords. The complexity of a transmitter, or space-time coder, may also be simplified by using cyclic space-time codes in accordance with the present invention.

Space-time codes in accordance with the present invention proposed for use with n=4 antennas, may be advantageous in that codes may be valid for arbitrary multilevel and complex modulation formats, such as QAM. As the number of transmit antennas in practical systems is generally expected to be relatively small, space-time codes in accordance with the present invention may advantageous for future communication systems with high data rates based on multilevel modulations. It should be noted that, taking jointly into account code length, rate and coefficients of information symbols, space-time block codes in accordance with the present invention is preferable for 4 antennas and arbitrary modulation format.

The invention has been described herein with reference to particular embodiments. However, it will be readily apparent to those skilled in the art that it may be possible to embody the invention in specific forms other than those described above. This may be done without departing from the spirit of the invention. Embodiments described above are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for transmitting a signal in a transmit diversity wireless communication system using 4 antennae, and a complex, multilevel orthogonal space-time code of dimension 4×n wherein n is an integer the method comprising the steps of:

configuring a first row of a multilevel orthogonal 4×n matrix $G_n^{(ML)}$ as an arbitrary cyclic version of a Generalized Chirp-Like (GCL) sequence of length n;

configuring a second row of the multilevel orthogonal 4×n matrix $G_n^{(ML)}$ ask a complex-conjugated version of the first row having inverted signs of the first n/2 or the last n/2 out of n consecutive symbols in the first row;

configuring a third row as a reverted version of the first row; and configuring a fourth row as a complex-conjugated version of the third row having inverted signs of the first n/2 or the last n/2 out of n consecutive symbols in the third row.

2. The method of claim 1, wherein a set of codewords try associated with the complex, multilevel orthogonal space-time code includes the 4 rows of $G_n^{(ML)}$.

3. The method of claim 2, wherein the transmit diversity wireless communication system includes a CDMA system and wherein the method further includes the steps of:

constructing the multilevel orthogonal 4×n matrix $G_n^{(ML)}$ such that the complex, multilevel orthogonal space-time code includes the set of codewords, wherein each of 4 codewords in the set of codewords includes a spreading code C; and simultaneously transmitting a different one of the set of codewords including the spreading code C, on a corresponding one of the 4 transmit antennae.

4. The method of claim 1, wherein the GCL sequence is of length n=4.

5. The method of claim 4, wherein a set of codewords associated with the complex, multilevel orthogonal space-time code includes 4 columns of matrix $G_4^{(ML)}$.

6. An apparatus for transmitting a signal in a transmit diversity wireless communication system using a complex, multilevel orthogonal space-time code of dimension 4×n, corresponding to 4 antennae, wherein n is an integer the apparatus comprising:

4 antennae; and a transmitter coupled to the 4 antennae, the transmitter configured to:

configure a first row of a multilevel orthogonal 4×n matrix $G_n^{(ML)}$ as an arbitrary cyclic version of a Generalized Chirp-Like (GCL) sequence of length n;

configure a second row of the multilevel orthogonal 4×n matrix $G_n^{(ML)}$ as a complex-conjugated version of the first row having inverted signs of the first n/2 or the last n/2 out of n consecutive symbols in the first row;

configure a third row as a reverted version of the first row; and configure a fourth row as a complex-conjugated version of the third row having inverted signs of the first n/2 or the last n/2 out of n consecutive symbols in the third row.

7. The apparatus of claim 6, wherein a set of codewords associated with the complex, multilevel orthogonal space-time code includes the 4 rows of $G_n^{(ML)}$.

8. The apparatus of claim 7, wherein the transmit diversity wireless communication system includes a CDMA system and wherein the transmitter is further configured to:

construct the multilevel orthogonal 4×n matrix $G_n^{(ML)}$ such that the complex, multilevel orthogonal space-time code includes the set of codewords, wherein each codeword in the set of codewords includes a spreading code C; and simultaneously transmit a different one of the set of codewords on a corresponding one of the 4 transmit antennae.

9. The apparatus of claim 6, wherein the GCL sequence is of length n=4.

10. The apparatus of claim 9, wherein a set of codewords includes n columns of matrix $G_n^{(ML)}$.

11. The apparatus of claim 6, wherein a set of codewords associated with the complex, multilevel orthogonal space-time code includes n columns of matrix $G_n^{(ML)}$.

* * * * *